United States Patent
Kumar et al.

(10) Patent No.: US 9,871,256 B2
(45) Date of Patent: Jan. 16, 2018

(54) FUEL CELL ELECTRODE HAVING NON-IONOMER PROTON-CONDUCTING MATERIAL

(71) Applicant: Nissan North America, Inc., Franklin, TN (US)

(72) Inventors: Amod Kumar, Farmington Hills, MI (US); Nilesh Dale, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 262 days.

(21) Appl. No.: 14/613,460

(22) Filed: Feb. 4, 2015

(65) Prior Publication Data

US 2016/0226074 A1    Aug. 4, 2016

(51) Int. Cl.
*H01M 8/10*    (2016.01)
*H01M 4/86*    (2006.01)
*H01M 4/92*    (2006.01)

(52) U.S. Cl.
CPC ....... *H01M 4/8663* (2013.01); *H01M 4/8605* (2013.01); *H01M 4/8673* (2013.01); *H01M 4/925* (2013.01); *H01M 4/923* (2013.01)

(58) Field of Classification Search
None
See application file for complete search history.

(56) References Cited

U.S. PATENT DOCUMENTS

| | | |
|---|---|---|
| 6,007,934 A | 12/1999 | Auer et al. |
| 6,855,453 B2 | 2/2005 | Bett et al. |
| 6,936,370 B1 | 8/2005 | Knights et al. |
| 7,767,330 B2 | 8/2010 | Merzougui et al. |
| 2003/0198849 A1* | 10/2003 | Hampden-Smith ...... B01J 21/18 429/483 |
| 2004/0018416 A1 | 1/2004 | Choi et al. |
| 2005/0287418 A1* | 12/2005 | Noh ....................... B82Y 30/00 429/483 |
| 2006/0188775 A1 | 8/2006 | Mance et al. |
| 2006/0257719 A1* | 11/2006 | Merzougui ......... H01M 4/8605 429/442 |
| 2007/0037041 A1 | 2/2007 | Cai et al. |
| 2008/0145732 A1* | 6/2008 | Lopes Correia Tavares ............... H01M 4/8642 429/483 |
| 2013/0017473 A1 | 1/2013 | Kim et al. |
| 2013/0022890 A1 | 1/2013 | Kundu et al. |
| 2013/0122401 A1 | 5/2013 | Pietron et al. |
| 2014/0045678 A1 | 2/2014 | Kumta et al. |

(Continued)

FOREIGN PATENT DOCUMENTS

| | | |
|---|---|---|
| CA | 2857111 A1 | 6/2013 |
| EP | 2426763 A1 | 3/2012 |

(Continued)

OTHER PUBLICATIONS

McKeown et al., J. Phys. Chem. B, 1999, 103 (23), pp. 4825-4832.*
Walsh et al., Electrochimica Acta, 55 (2010) 6342-6351.*
Chen et al., Electrochemistry Communications, 7 (2005) 593-596.*

*Primary Examiner* — Eli Mekhlin
(74) *Attorney, Agent, or Firm* — Young Basile Hanlon & MacFarlane, P.C.

(57) ABSTRACT

An active material layers for a fuel cell membrane electrode assembly includes metal oxide particles, a non-ionomer proton conductor and active catalyst particles supported on the metal oxide particles.

5 Claims, 1 Drawing Sheet

(56) References Cited

U.S. PATENT DOCUMENTS

2014/0065516 A1 3/2014 Mavrikakis et al.
2014/0349203 A1* 11/2014 Klose-Schubert .. H01M 4/9016
  429/418

FOREIGN PATENT DOCUMENTS

| EP | 2477264 | A2 | | 7/2012 | |
|----|---------|----|----|--------|--|
| EP | 2608298 | A1 | * | 6/2013 | .......... H01M 4/9016 |
| WO | 2011122757 | A2 | | 10/2011 | |
| WO | 2013092568 | A1 | | 6/2013 | |

* cited by examiner

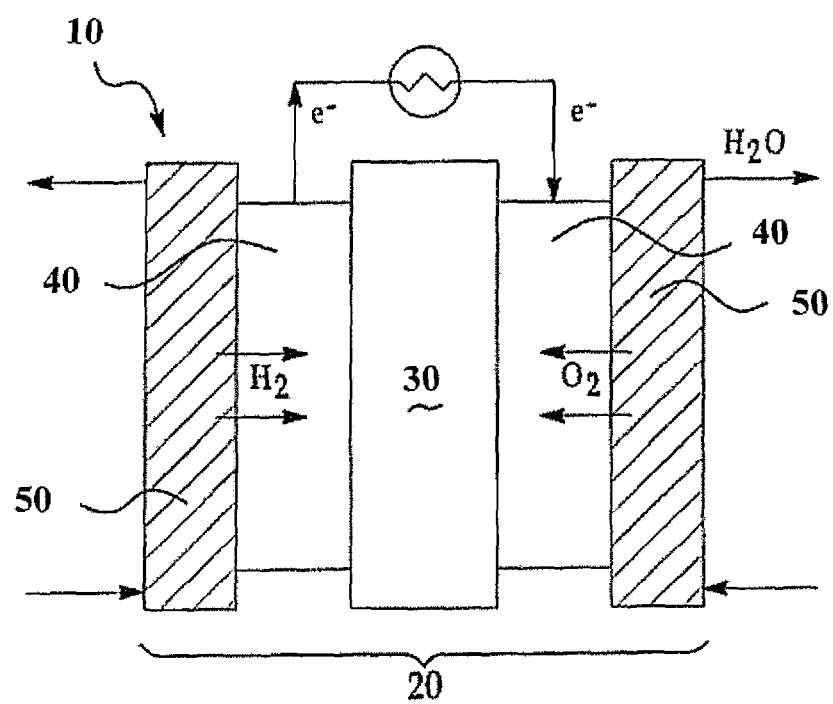

FUEL CELL ELECTRODE HAVING NON-IONOMER PROTON-CONDUCTING MATERIAL

TECHNICAL FIELD

This disclosure relates to fuel cell electrodes having non-ionomer proton conducting material.

BACKGROUND

Carbon has traditionally been the most common material of choice for polymer electrolyte fuel cell (PEFC) electrocatalyst supports due to its low cost, high abundance, high electronic conductivity, and high Brunauer, Emmett, and Teller (BET) surface area, which permits good dispersion of platinum (Pt) active catalyst particles. However, the instability of the carbon-supported platinum electrocatalyst due at least in part to carbon corrosion is a key issue that currently precludes widespread commercialization of PEFCs for automotive applications.

To address the issues with carbon-based catalyst, non-carbon alternatives are being investigated, such as metal oxides. However, the cost of other materials used for PEFCs remains high. One example of another high cost material is the ionomer used to provide proton conductivity, such as NAFION™. Furthermore, the ionomer in the catalyst layer can react with platinum and reduce the platinum activity.

SUMMARY

Disclosed herein are active material layers for a fuel cell membrane electrode assembly. One embodiment of an active material layer for a fuel cell membrane electrode comprises metal oxide support particles, a non-ionomer proton conductor and active catalyst particles supported on the metal oxide support particles.

Also disclosed are fuel cell membrane electrode assemblies. One embodiment of a fuel cell membrane electrode assembly comprises a membrane, a gas diffusion layer and an active material layer between the membrane and the gas diffusion layer. The active material layer comprises non-carbon support particles comprising one or both of titanium dioxide and Magnéli phase $Ti_4O_7$, active catalyst particles supported on the non-carbon support particles and a non-ionomer proton conductor.

These and other aspects of the present disclosure are disclosed in the following detailed description of the embodiments, the appended claims and the accompanying FIGURES.

BRIEF DESCRIPTION OF THE DRAWINGS

The various features, advantages and other uses of the present apparatus will become more apparent by referring to the following detailed description and drawing in which:

FIG. 1 is a schematic of a fuel cell using the active material layer disclosed herein.

DETAILED DESCRIPTION

Disclosed herein are active material layers for a fuel cell membrane electrode assembly. One embodiment of an active material layer for a fuel cell membrane electrode comprises metal oxide support particles, a non-ionomer proton conductor and active catalyst particles supported on the metal oxide particles.

The metal oxide support particles are used as the catalyst support, providing high surface area on which to support active catalyst particles. The metal oxide support can be one or more metal oxides prepared with varying ratios of metal oxides and various particle sizes depending on the metal oxides used. One example of a metal oxide is titanium dioxide, which has very good chemical stability in acidic and oxidative environments. However, titanium dioxide is a semiconductor and its electron conductivity is very low. Another non-limiting example of a metal oxide is Magnéli phase $Ti_4O_7$, which, unlike titanium dioxide, is electron conductive. Other metal oxides having high surface area for use as catalyst support known to those skilled in the art are also contemplated.

Active catalyst particles are deposited onto the metal oxide support particles. The active catalyst particles can include one or a combination of precious metals such as platinum, gold, rhodium, ruthenium, palladium and iridium, and/or transition metals such as cobalt and nickel. The precious metal can be in various forms, such as alloys, nanowires, nanoparticles and coreshells, which are bimetallic catalysts that possess a base metal core surrounded by a precious metal shell.

The non-ionomer proton conductor is added to the active material layer to provide the requisite proton conduction. Typically, to obtain the requisite proton conductivity in the catalyst layer, costly ionomers such as perfluorocarbon sulfonic acid polymers, known, for example, as NAFION™, are intermixed with the catalyst particles to provide the requisite proton conductivity. However, such ionomers can react with the active catalyst particle, reducing the catalyst activity and oxygen mass transport. The non-ionomer proton conductors disclosed herein will not react with the active catalyst particles and will improve the economics of the fuel cell active material layer.

The non-ionomer proton conductor can be hydrous ruthenium dioxide. The hydrous ruthenium dioxide can be intermixed with the catalyst particles. Alternatively, the hydrous ruthenium dioxide can be deposited on the metal oxide support particles prior to depositing the active catalyst particles. Hydrous ruthenium dioxide is both proton conducting and electron conducting. Accordingly, the metal oxide support particles can be one or both of titanium dioxide and Magnéli phase $Ti_4O_7$. Using hydrous ruthenium dioxide as the non-ionomer proton conductor will also provide some electron conductivity, allowing for the use of the poor conducting titanium dioxide without adding another electron conducting material. To obtain the necessary proton and electron conductivity, the degree of hydration of the hydrous ruthenium dioxide can be adjusted to affect its proton and electron conductivity. The degree of hydration can be selected to achieve the requisite balance of proton and electron conductivity. As another non-limiting example, carbon material or another conductive metal oxide can be mixed with the hydrous ruthenium dioxide to increase the electron conductivity to achieve the requisite proton and electron conductivity as needed when a poor electron conductor is used as the support particles.

The non-ionomer proton conductor can be, for example, sulfonic acid functionalized silica. Sulfonic acid functionalized silica is proton conducting, but provides no electron conduction. Using Magnéli phase $Ti_4O_7$ as the metal oxide support material provides the requisite electron conductivity when the non-ionomer proton conductor is sulfonic acid functionalized silica. To overcome the deficiencies of the poor electron conductivity of titanium dioxide when used as the support material, an electron conducting material can be added to the catalyst layer. The electron conducting material can be a carbon material that is intermixed with the catalyst particles. The carbon material does not need to be high surface area carbon, as the active catalyst particles will not be supported on the carbon material. The carbon material can be, as non-limiting examples, graphite, graphene, surface modified graphite or combinations thereof.

FIG. 1 illustrates the use of active material layer described herein in a fuel cell membrane electrode assembly. FIG. 1 is a schematic of a fuel cell 10, a plurality of which makes a fuel cell stack. The fuel cell 10 is comprised of a single membrane electrode assembly 20. The membrane electrode assembly 20 has a membrane 30 coated with the active material layer 40 with a gas diffusion layer 50 on opposing sides of the membrane 30. The membrane 30 has active material layers 40 formed on opposing surfaces of the membrane 30, such that when assembled, the active material layers 40 are each between the membrane 30 and a respective gas diffusion layer 50. Alternatively, a gas diffusion electrode is made by forming one active material layer 40 on a surface each of two gas diffusion layers 50 and sandwiching the membrane 30 between the gas diffusion layers 50 such that the active material layers 40 contact the membrane 30. When fuel, such as hydrogen gas (shown as $H_2$), is introduced into the fuel cell 10, the active material layer 40 splits hydrogen gas molecules into protons and electrons. The protons pass through the membrane 30 to react with the oxidant (shown as $O_2$), such as oxygen or air, forming water ($H_2O$). The electrons (e), which cannot pass through the membrane 30, must travel around it, thus creating the source of electrical energy.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel cell membrane electrode assembly comprising:
   a membrane;
   an active material layer formed on opposite sides of the membrane;
   a gas diffusion layer for diffusing hydrogen on one active material layer;
   a hydrogen source for delivering the hydrogen to the gas diffusion layer;
   another gas diffusion layer for diffusing oxidant on another active material layer; and
   an oxygen source for delivering the oxidant to the other gas diffusion layer, wherein each active material layer comprises composite particles consisting of:
      non-carbon metal oxide support particles;
      hydrous ruthenium dioxide as a non-ionomer proton conductor;
      active catalyst particles supported on the non-carbon metal oxide support particles; and
      a binder, wherein the active material layer comprises no ionomer proton conductor.

2. The fuel cell membrane electrode assembly of claim 1, wherein the hydrous ruthenium dioxide is supported on the non-carbon metal oxide particles.

3. The fuel cell membrane electrode assembly of claim 1, wherein the non-carbon metal oxide support particles are titanium dioxide.

4. The fuel cell membrane electrode assembly of claim 1, wherein the non-carbon metal oxide support particles are Magnéli phase $Ti_4O_7$.

5. The fuel cell membrane electrode assembly of claim 1, wherein the active catalyst particles are platinum.

* * * * *